United States Patent [19]

McGlade

[11] Patent Number: 4,651,571

[45] Date of Patent: Mar. 24, 1987

[54] STRAIN SENSOR

[75] Inventor: Stuart M. McGlade, Chelmsford, Great Britain

[73] Assignee: Fisher Controls International, Inc., Marshalltown, Iowa

[21] Appl. No.: 708,402

[22] Filed: Mar. 5, 1985

[51] Int. Cl.⁴ .......................... G01B 7/16; G01L 1/10
[52] U.S. Cl. ..................................... 73/773; 73/778; 73/862.59; 250/227; 340/870.28
[58] Field of Search ................. 73/773, 778, 702, 703, 73/704, 862.59, 517 AV, DIG. 1, DIG. 4; 374/117; 340/870.28; 331/155; 250/227

[56] References Cited

U.S. PATENT DOCUMENTS

| 3,619,612 | 11/1971 | Belke | 73/862.35 |
| 4,417,140 | 11/1983 | Adolfsson et al. | 250/227 |
| 4,435,986 | 3/1984 | Choffat | 73/702 |
| 4,490,606 | 12/1984 | Lockett et al. | 250/227 |
| 4,525,874 | 6/1985 | Baues | 455/612 |

FOREIGN PATENT DOCUMENTS 0090167 5/1983 European Pat. Off. .

Primary Examiner—Charles A. Ruehl
Attorney, Agent, or Firm—Marshall, O'Toole, Gerstein, Murray & Bicknell

[57] ABSTRACT

A strain sensor includes a quartz crystal element 9 having a resonant frequency which is dependent on strain imposed on it. The crystal element 9 is caused to vibrate at its resonant frequency by pulses of light transmitted along an optical fibre 5 from a remote location indicated generally at 1. A signal produced by the vibration at the resonant frequency is taken from electrodes 10 and 12 and amplified at 13 and 14 before being used to switch on and off a switch 15 controlling a light source 16. The output from the light source 16, consisting of flashes of light of a frequency indicative of the strain, is transmitted along a second optical fibre 19 and is detected by a photocell 20. The frequency of the output of photocell 20 is measured at 21 to give the desired measurement of strain and to provide feedback to the drive unit 3 which determines the frequency of the flashes of light produced at 2.

5 Claims, 1 Drawing Figure

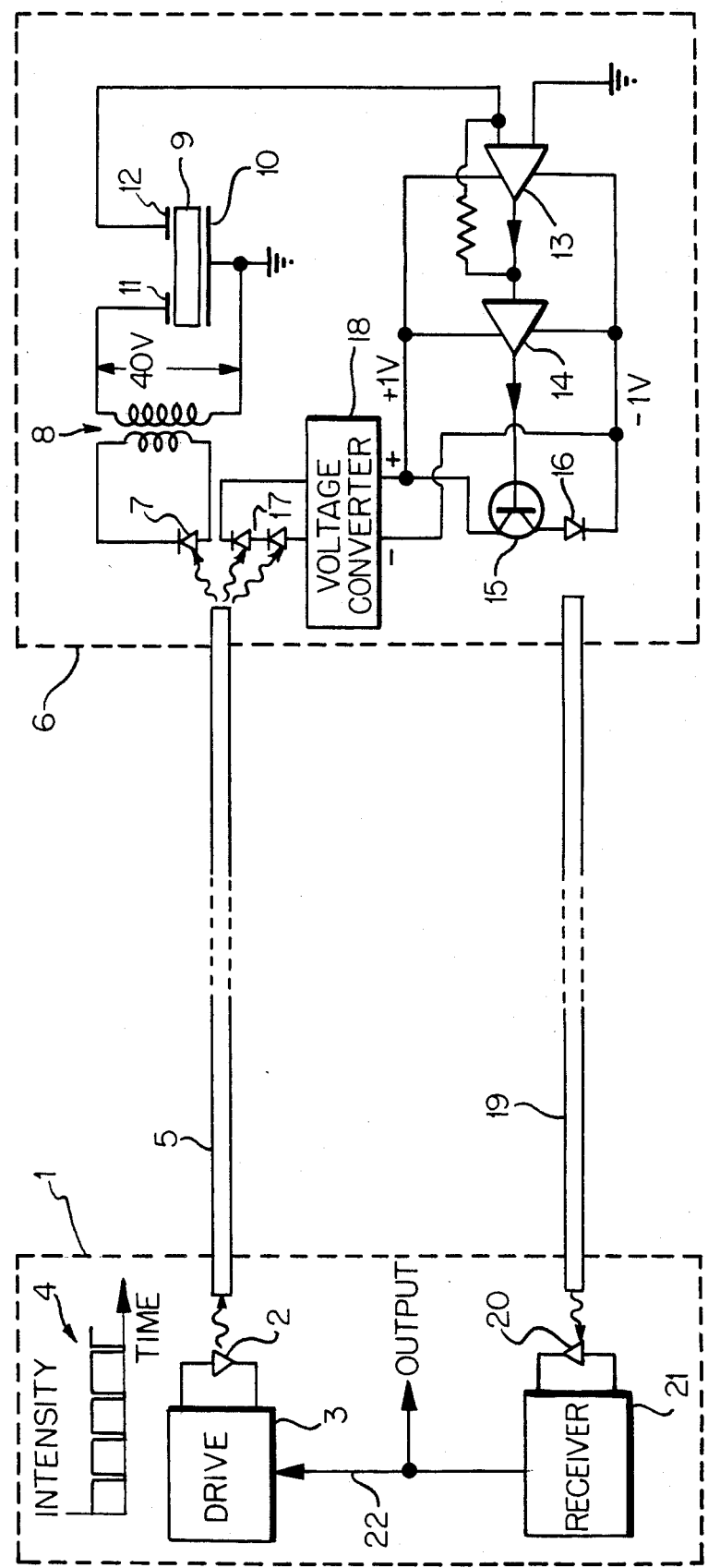

STRAIN SENSOR

This invention relates to a "strain sensor" which term is used in this specification both to refer to apparatus which produces an indication of strain and to apparatus which, by sensing strain, is able to give an indication of some physical property such as temperature or pressure which is related to strain. The invention arose in the design of a strain sensor for use in environments where it is not convenient or not desirable, e.g., because of a fire risk or because of risk of electrical interference, to transmit electrical energy to and from the point where the strain is to be measured.

A known strain sensor for use in such environments is described in European Patent Specification No: 0090167. FIG. 1 of that Specification shows a sensor element in the form of a wire which vibrates at a frequency dependent on the tension applied to it. The wire is at a first location to which light is transmitted from two separate light sources in a control room at a second location. Light pulses from one of these sources is used to produce electric current which induces vibration of the wire. Light transmitted continuously from the other source is reflected off the wire when it passes through a given position during each cycle of its vibration thereby producing pulses of light at the frequency of vibration, which is indicative of strain. These light pulses, reflected from the wire, are transmitted to the control room at the second location where their frequency is measured and used as an indication of strain.

The known system referred to above suffers from a number of disadvantages. Firstly, it requires the use of at least one beam splitter which necessarily introduces extra expense, bulk and energy loss. Secondly, the technique of reflecting light from a vibrating wire may result in a large energy loss since, as pointed out in European Specification No: 0090167, only a portion of the light wil be reflected back along the path from whence it came. For this reason, expensive microlenses are needed, as described on page 5 lines 26 to 30, to make use of all the available energy. Thirdly, the modulation depth achieved by such an arrangement is limited i.e., the light is not modulated by 100% of its original intensity by the vibrating wire. Fourthly, the shape of the pulses of light is likely to be more in the form of a sine wave than the required square wave, necessitating the use of a pulse shaping circuit before the frequency of the pulses can be detected. Fifthly, the system described in the European Specification No: 0090167 relies for its operation on a large amplitude of vibration, see line 21 page 9. From the point of view of mechanical performance it is better to have smaller vibrations.

Finally, the vibrating wire sensor of the aforementioned European Specification, requires a special hole to be drilled through the field coil for the optical output fibre and is capable of producing an optical output only. This sensor is therefore restricted in its applications to optical systems, unlike the sensor used in the embodiment of the invention to be described in which a piezoelectric sensor gives an electrical output and can therefore be used in other environments, thereby reducing the cost per sensor by virtue of bulk production.

This invention aims to reduce the problems described above and provides a strain sensor comprising: at a first location optical to electrical transducing means, a sensor element of the type of which has a resonant frequency dependent on strain imposed on it, and means for using energy from the transducing means to stimulate vibration of the element, to amplify a signal produced as a result of the vibration and to generate light modulated in accordance with that signal and therefore carrying information indicative of the strain; means for transmitting the modulated light carrying this information to a second location; at the second location means for receiving this modulated light carrying information indicative of strain, and a light source; and means for transmitting light from the light source at the second location to the transducing means at the first location.

By using some of the electrical energy from the transducing means to amplify the signal produced as a result of the vibration it is possible to ensure that the amplified signal is in exactly the required form, preferably in the form of a series of square shaped pulses which are then converted into well defined optical pulses of 100% modulation occurring at the same frequency as the frequency of vibration of the element. The electronic amplification of the signal does however also lend itself to an alternative procedure of generating pulses of light constituting a binary code defining the frequency of vibration, but these pulses not appearing at that frequency. It is notable that, because there is no need to transmit light both to and from the sensor element of the invention, as in the arrangement shown in FIG. 1 of the aforementioned European Patent Specification, there is no need for a beam splitter equivalent to that shown in that Figure, or the three beam splitters shown in FIG. 2.

The sensor element is preferably a piezoelectric element such as a quartz crystal provided with suitable electrodes. The frequency of vibration of such a crystal varies with varying strain on it and, it can conveniently be induced to vibrate by applying electric pulses to it: and will generate electric signals as a result of and at the frequency of vibration.

The strain may be imposed by a force acting externally on the sensor or may be generated internally e.g., by temperature changes or gradients within the element in which latter case the indication of strain can be used as an indication of temperature.

One way in which the invention may be performed will now be described by way of example with reference to the accompanying schematic drawing of a strain sensor constructed in accordance with the invention.

At a first location, indicated generally by the reference numeral 1 on the drawing, is positioned a source of light 2 which, in this particular embodiment, is a laser diode. The laser diode 2 is driven by a drive circuit 3 so as to produce pulses of light as shown graphically at 4 having relatively long pulse periods compared with the interpulse periods. The drive circuit 3 has a nominal frequency of 20 kHz but this can be controlled to a limited extent by a control signal on a line 22. The choice of drive circuit 3 will be appropriate to the laser diode 2. Transistor VN66AF used as specified by the manufacturer is suitable. In some embodiments a phase locked loop is used which is not shown but could be part of the drive. This could be National Semiconductor NE565.

Pulses of light from the laser diode 2 are transmitted along an optical fibre line 5 to a remote location indicated generally at 6. The light issuing from the optical fibre line 5 is incident on a bank of photodetectors or solar cells of which, for simplicity of illustration, only three are shown in the drawing. A minority of these detectors, as indicated by the single cell 7, are connected to the primary of a step up transformer 8. Because of the intermittent nature of the light pulses the transformer 8 generates an increased a.c. voltage of approximately 40 V peak-to-peak across its secondary coil. This 40 V alternating voltage is applied across a quartz crystal device 9 by means of electrodes 10 and 11. It stimulates the quartz to oscillate at its resonant frequency which is nominally 20 kHz i.e., the same nominal frequency as the drive circuit 3, but which varies about this frequency depending on the strain imposed on the quartz crystal 9. The oscillations of the crystal 9 cause the crystal, because it is piezoelectric, to generate a voltage across electrodes 10 and 12 at a frequency equal to the frequency of vibration. This piezoelectric voltage causes current flow through an amplifier 13 acting as a current-to-voltage convertor. The output voltage of the current-to-voltage convertor 13 is amplified at 14 and is used to switch on and off a switch 15 in time with the pulses generated between electrodes 10 and 12.

The majority 17 of the photocells receiving light from the fibre optic line 5 produce an output of +1 V which is applied to a voltage convertor 18 which produces outputs of +1 V and −1 V used to drive the devices 13 and 14. Any suitable voltage convertor can be used at 18 but Intersil ICL7660PC is an example of a suitable readily available circuit.

The switch 15 is connected across the +1 V and −1 V outputs of the voltage convertor 18 and in series with the light emitting diode 16 so that the latter is switched on and off in time with the oscillations of the crystal 9. The resulting light is transmitted along a fibre optic line 19 to the first mentioned location 1 where the light is received by a photocell 20. The frequency of the output of the photcell 20 is measured in a receiving circuit 21 which a suitable circuit is National Semi-Conductor LH0082 Fibre Optic Receiver. This produces an output on line 22 indicative of the frequency of vibration of the crystal 9 and therefore indicative of the strain imposed on it. The signal on line 22 is used both as an output of the device giving a measure of the strain and as a feedback signal to the drive circuit 3 as previously described. This feedback arrangement facilitates resonation of the crystal at the particular frequency dependent on the load.

In an alternative form of the invention the drive 3 for the light source 2 could be designed to repetitively sweep the frequency through a range including the nominal frequency of 20 kHz. In such an arrangement the receiver 21 would be replaced by a device for detecting the frequency at which the light received by the detector 20 reached a maximum intensity. In this embodiment of the invention there would be no need for a feedback from the receiver 21 to the drive 3.

Other modifications are of course possible. For example the transformer shown at 8 could be replaced by any one of many other possible voltage increasing devices. Alternatively the components 8 and 18 could be replaced by a single transformer having two secondaries designed to produce a high voltage for stimulating the piezoelectric element, and a low voltage for the amplifier.

In another arrangement the illustrated amplifier could be replaced by an amplifier/encoder designed to produce pulses of light at 16 in the form of an encoded message representing the frequency of vibration. A suitable decoder would of course then be needed at the location 1.

I claim:

1. A strain sensor comprising: at a first location optical to electrical transducing means, a sensor element of the type which has a resonant frequency dependent on strain imposed on it, and means for using energy from the transducing means to stimulate vibration of the element, to amplify a signal produced as a result of the vibration and to generate light modulated in accordance with that signal and therefore carrying information indicative of the strain; means for transmitting the modulated light carrying this information to a second location; at the second location means for receiving this modulated light carrying information indicative of strain, and a pulsed light source which causes the transducing means at the first location to produce pulses of voltage within a frequency band chosen to stimulate the said vibration; and means for transmitting light from the light source at the second location to the transducing means at the first location.

2. A strain sensor according to claim 1 in which the sensor element is piezoelectric, is arranged to be stimulated into vibration by electric energy from the transducing means and is arranged to generate an electric signal as a result of the said vibration.

3. A strain sensor according to claim 1 including a transformer for increasing the voltage of the pulses.

4. A strain sensor according to claim 3, including a feedback arrangement at the second location arranged to use the optical signal returned from the first location to control the pulse repetition frequency of the source of light.

5. A strain sensor according to claim 1, including a feedback arrangement at the second location arranged to use the optical signal returned from the first location to control the pulse repetition frequency of the source of light.

* * * * *